No. 648,665. Patented May 1, 1900.
M. L. HOYT.
CENTRIFUGAL LIQUID SEPARATOR.
(Application filed May 24, 1899.)
(No Model.) 2 Sheets—Sheet 2.
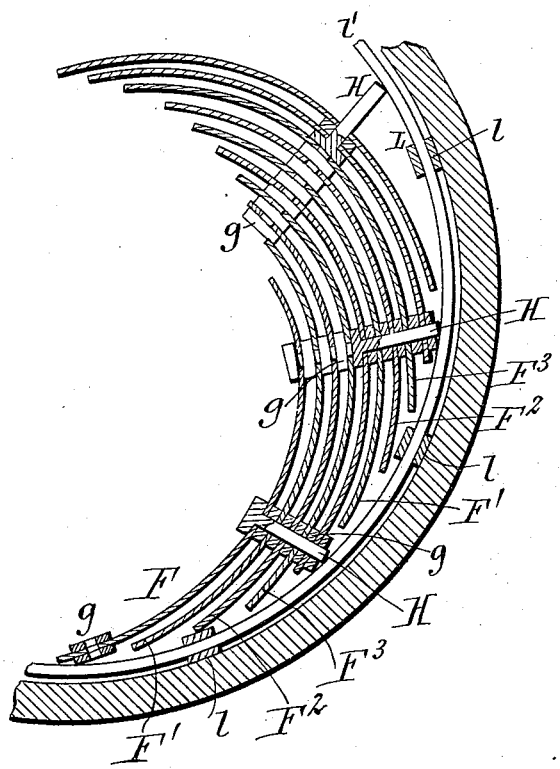
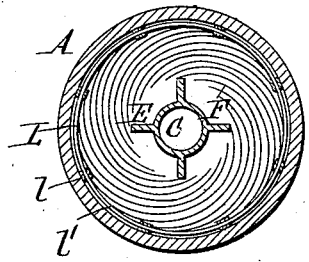
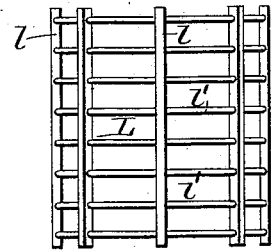
Witnesses: M. L. Hoyt, Inventor.

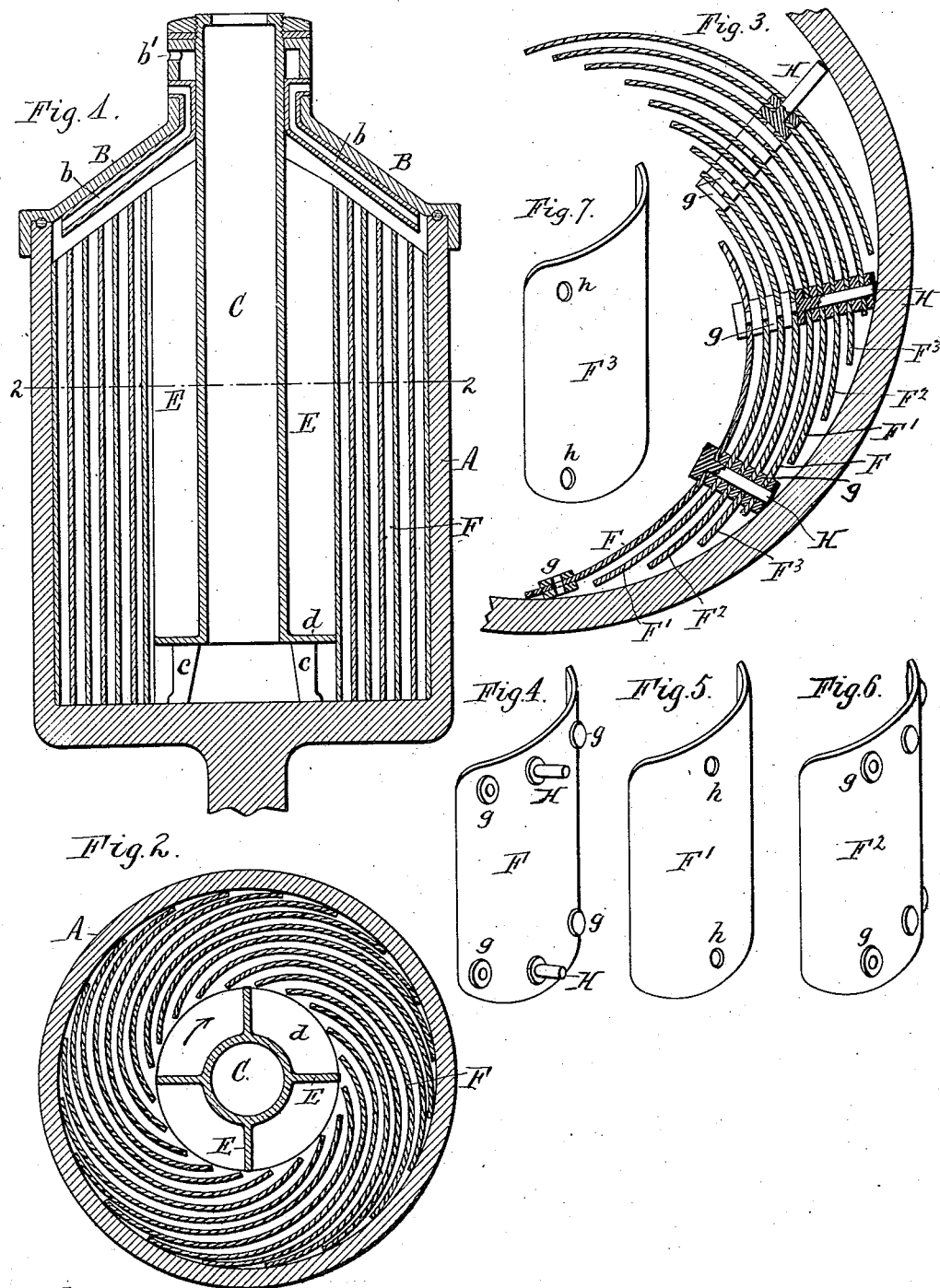

UNITED STATES PATENT OFFICE.

MATTHEW L. HOYT, OF BIRCHTON, NEW YORK, ASSIGNOR TO D. H. BURRELL & CO., OF LITTLE FALLS, NEW YORK.

CENTRIFUGAL LIQUID-SEPARATOR.

SPECIFICATION forming part of Letters Patent No. 648,665, dated May 1, 1900.

Application filed May 24, 1899. Serial No. 718,003. (No model.)

*To all whom it may concern:*

Be it known that I, MATTHEW L. HOYT, a citizen of the United States, residing at Birchton, in the county of Saratoga and State of New York, have invented new and useful Improvements in Centrifugal Liquid-Separators, of which the following is a specification.

This invention relates to the laminate division contrivances which are placed in the liquid-space of centrifugal liquid-separators, particularly centrifugal creamers, and which consist of numerous leaves or blades by which the body of liquid is divided into numerous thin layers in which the separation is more rapidly and completely effected than when the liquid is acted upon in a single body or mass. A division contrivance of this character is described in Letters Patent of the United States granted to me January 5, 1897, No. 574,607. In the contrivance of this patent the blades are movably connected, so that they can be opened out or unfolded for cleaning when the device is removed from the bowl and so that the outer edges of the blades support themselves against the peripheral wall of the bowl when the device is in use.

The object of the present invention is to employ in the bowl separate or disconnected blades which are entirely detached from each other when removed from the bowl and are therefore easily cleaned, but can be readily so placed in the bowl as to fill the liquid-space thereof and which hold themselves while in use in the proper position with reference to each other and with reference to the bowl.

In the accompanying drawings, consisting of two sheets, Figure 1 is a vertical section of the bowl of a centrifugal liquid-separator, showing the general arrangement of the blades of the division contrivance, but omitting the interlocking devices and space-blocks. Fig. 2 is a horizontal section in line 2 2, Fig. 1. Fig. 3 is a horizontal section, on an enlarged scale, of a portion of the division contrivance, the thickness of the parts and the spaces between the blades being exaggerated to represent the parts more clearly. Figs. 4, 5, 6, and 7 are detached perspective views of different blades of the division contrivance. Fig. 8 is a horizontal section, on an enlarged scale, of a portion of the division contrivance, showing the blades thereof confined by a surrounding cage. Fig. 9 is a horizontal section, on a reduced scale, showing the blades held together by the surrounding cage, the interlocking devices being omitted for the purpose of simplifying the figure. Fig. 10 is an elevation of the cage.

Like letters of reference refer to like parts in the several figures.

A represents the bowl of a centrifugal liquid-separator which may be of any usual or suitable construction. As shown in the drawings, the bowl is provided with the usual removable cover B, which contains the escape-pipes $b$ for the skim-milk and the cream-discharge $b'$.

C represents the central feed-pipe, which projects through the neck of the cover and is provided at its lower end with feet $c$, by which the lower end of the pipe is supported at a short distance above the bottom of the bowl. The lower end of the pipe is provided with an outwardly-projecting horizontal flange $d$.

E represents upright wings secured to the outer side of the feed-pipe.

F F' F² F³ represent the blades or leaves of the division contrivance, which are arranged in an upright position in the liquid-space of the bowl. These blades are arranged tangentially or eccentric around the axis of the bowl and are of such width and number that they will bear with their outer portions against the peripheral wall of the bowl and will occupy the liquid-space of the bowl circumferentially when standing at the proper distance apart. The blades are preferably curved, as shown, and arranged with their concave sides forwardly in the direction in which the bowl rotates, as indicated by the arrow in Fig. 2. Blades arranged in this manner intersect the radial lines of the bowl and greatly expedite and improve the separation. While I prefer to employ curved blades, I do not wish to limit myself to this form, as other forms may be employed.

The blades or leaves are disconnected, detachable, or separate, so that when the division contrivance is removed from the bowl each plate can be entirely separated from every other blade, whereby the cleaning of the blades is greatly facilitated. The blades are provided with space-blocks g of the proper thickness to hold the blades at the desired distance apart when arranged in the bowl.

H represents interlocking pins or studs which project from the sides of the blades and pass through corresponding openings h in the adjacent blades. These pins and openings are so arranged that when the blades are engaged with each other by these pins and openings the blades will be held in the proper relative position, one slightly behind the other, or in echelon circumferentially, as shown in Fig. 3. These studs and pins form very simple and effective interlocking devices, which enable the blades to be assembled in the proper relation before being placed in the bowl and which retain the blades in this relation or in apposition when assembled and while in use. The heads of the interlocking studs are preferably utilized as space-blocks and the openings are preferably formed, as far as possible, in corresponding space-blocks, as shown in the drawings. As shown in Figs. 3, 4, 5, and 6, the blades F, to which pins are attached, alternate with blades F' F² F³, which carry no pins; but this arrangement may be varied as may be most convenient. While these interlocking studs and openings are here applied to detached or disconnected blades, it is obvious that they may also be applied to blades which are movably connected. If desired, the blades may be confined, as shown in Figs. 8, 9, and 10, in a foraminous jacket or cage L, of any suitable construction, which permits of the free escape of the separated skim-milk from the spaces between the blades and of the free flow of the skim-milk upwardly along the peripheral wall of the bowl. In the drawings this cage or jacket is represented as being composed of upright bars l and horizontal curved connecting rods or wires l'. The bars l rest against the peripheral wall of the bowl and center the device in the bowl.

I claim as my invention—

1. A laminate division contrivance for centrifugal liquid-separators consisting of an annular series of separable, tangential or eccentric blades provided with interlocking devices which hold adjacent blades in apposition when put together and prevent the displacement of the blades in the surface direction of the same, substantially as set forth.

2. A laminate division contrivance for centrifugal liquid-separators consisting of an annular series of separable tangential or eccentric division-blades provided with interlocking projections and openings whereby adjacent blades are held against displacement on each other, substantially as set forth.

3. The combination with the bowl of a centrifugal liquid-separator, of an annular series of upright, tangential or eccentric division-blades which are disconnected and provided with interlocking devices which hold adjacent blades rigidly in apposition when put together and prevent the displacement of the blades in the surface direction of the same, said blades having also spacing projections whereby the blades are held apart, substantially as set forth.

4. The combination with a laminate division contrivance for centrifugal liquid-separators, consisting of an annular series of disconnected, tangential or eccentric blades provided with interlocking devices which hold adjacent blades rigidly in apposition when put together and prevent displacement of the blades in the surface direction of the same, and an annular restraining device which is removably applied to said blades and confines the outer edges of the same, substantially as set forth.

5. A laminate division contrivance for liquid-separators, having its division-blades provided with interlocking studs and openings, the studs of one blade passing through the opening or openings in the adjacent blade or blades and retaining the blades against displacement with reference to each other, substantially as set forth.

6. A laminate division contrivance for liquid-separators having its division-blades provided with interlocking studs and openings, the studs of one blade passing through the opening or openings in the adjacent blade or blades and retaining the blades against displacement with reference to each other, and space-blocks arranged on the blades in line with each other, substantially as set forth.

Witness my hand this 18th day of April, 1899.

MATTHEW L. HOYT.

Witnesses:
LOOMIS BURRELL,
F. A. TWIKER.